United States Patent
Tenorio

(10) Patent No.: US 7,818,243 B1
(45) Date of Patent: Oct. 19, 2010

(54) DISPLAYING STRIKES BETWEEN BIDS AND ASKS IN A MARKET OVER TIME USING POLYGONS

(75) Inventor: Manoel Tenorio, Mountain View, CA (US)

(73) Assignee: i2 Technologies US, Inc., Dallas, TX (US)

( * ) Notice: Subject to any disclaimer, the term of this patent is extended or adjusted under 35 U.S.C. 154(b) by 1723 days.

(21) Appl. No.: 09/976,750

(22) Filed: Oct. 12, 2001

(51) Int. Cl.
*G06F 17/60* (2006.01)

(52) U.S. Cl. .............................. 705/37; 705/4; 705/35; 705/36

(58) Field of Classification Search ............... 705/1–50; 380/200; 382/162, 232, 248
See application file for complete search history.

(56) References Cited

U.S. PATENT DOCUMENTS

| | | | |
|---|---|---|---|
| 5,689,652 A | 11/1997 | Lupien et al. | 395/237 |
| 5,845,266 A | 12/1998 | Lupien et al. | 705/37 |
| 5,913,197 A * | 6/1999 | Kameda | 705/3 |
| 6,016,483 A * | 1/2000 | Rickard et al. | 705/36 R |
| 6,098,051 A * | 8/2000 | Lupien et al. | 705/36 R |
| 6,366,910 B1 * | 4/2002 | Rajaraman et al. | 707/5 |
| 6,963,867 B2 * | 11/2005 | Ford et al. | 707/3 |
| 2001/0044771 A1 * | 11/2001 | Usher et al. | 705/37 |
| 2003/0088452 A1 * | 5/2003 | Kelly | 705/10 |

OTHER PUBLICATIONS

Rui Albuquerque, Optimal Currency Hedging, Apr. 11, 2003, University of Rochester, web, pp. 1-10.*

@The Moment: The Platform for Real-Time Trading; "How Quickly Can You Respond to Your Markets?" pp. 1, 2001.
@The Moment Solutions; "Dynamic Trading for a Dynamic World" pp. 1, 2001.
Trade@The Moment: The Platform for Real-Time Trading; pp. 1-2, 2001.
@The Moment Real-Time Trading Applications; pp. 1-2, 2001.
@The Moment Professional Services; pp. 1, 2001.
@The Moment Trade @The Moment FAQ; "Frequently Asked Questions (FAQ) About Dynamic Trading" pp. 1-9, 2001.

(Continued)

*Primary Examiner*—Mary Cheung
*Assistant Examiner*—Marissa Liu
(74) *Attorney, Agent, or Firm*—Booth Udall, PLC; Steven J. Laureanti

(57) ABSTRACT

A system for displaying strikes between bids and asks in a market over time includes a computer system. The computer system receives data for a plurality of strikes reflecting values specified in the strikes for a plurality of strike variables. The computer system generates a display of the received data. The display includes multiple polygons each representing a strike between a bid and an ask. Each polygon includes multiple contiguous parallelograms each associated with one or more different strike variables. One or more dimensions of each parallelogram each reflecting a value specified in the represented strike for a strike variables associated with the parallelogram. The display includes a strike variable axis representing a range of values for an additional strike variable. Each polygon is positioned with respect to the strike variable axis according to the value specified in the represented strike for the additional strike variable. The display includes a time axis with respect to which each polygon is positioned according to the time at which the represented strike occurred.

22 Claims, 2 Drawing Sheets

OTHER PUBLICATIONS

Trade@The Moment Demos; pp. 1, 2001.
@The Moment Screen Shots; pp. 1-3, 2001.
Market Operator Navigation; pp. 1, 2001.
Market Type Selection Page; pp. 1-2, 2001.
Market Access Control Selection Page; pp. 1-2, 2001.
Market Report; "marketplace@themoment;" pp. 1, 2001.
Bid/Ask Pricing Page, pp. 1-4, 2001.
Auction Page; pp. 1-4, 2001.
Bid/Ask Page/Pitometer; pp. 1-4, 2001.
Bid/Ask Page/Order Book; pp. 1-4, 2001.
@TheMoment Technology; pp. 1-2, 2001.
@TheMoment Papers; pp. 1, 2001.
@TheMoment Reliant Energy Customer Story; "Reliant First ERCOT Auction for Electricity Generation Capacity;" pp. 1-2.
@TheMoment White Papers; pp. 1, 2001.
@TheMoment White Paper Series; "Leveraging Web-Based Dynamic Trading for Gas Pipeline Capacity Sales;" pp. 1-8, Jul. 2001.
@TheMoment White Paper Series; "Building Competitive Advantage in Turbulent Markets Through Web-Based Dynamic Trading Technologies;" pp. 1-12, Aug. 2001.
@TheMoment White Paper Series; "Reducing Inventory Risks in High-Tech Component Manufacturing with Forward Contracts;" pp. 1-12, Aug. 2001.
@TheMoment White Paper Series; "The Role off Web-Based Dynamic Trading in Restructured Electric and Gas Markets;" pp. 1-14, Oct. 2001.
Trade@TheMoment: LDC Data Sheet; "The Complete Trading Solution for LDCs;" pp. 1-4, Oct. 2001.
Trade@TheMoment:Power Data Sheet; "The Complete Trading Solution for Electric Utilities;" pp. 1-2, Nov. 2001.
Lian-Sheng Tsai, Director, First Office Action for Patent Application No. 91123498, Mailed, Date of Receipt: Mar. 31, 2004, entitled "Displaying Strikes Between Bids and Asks in a Market over time Using Polygons," 1 page, Received Mar. 31, 2004.

* cited by examiner

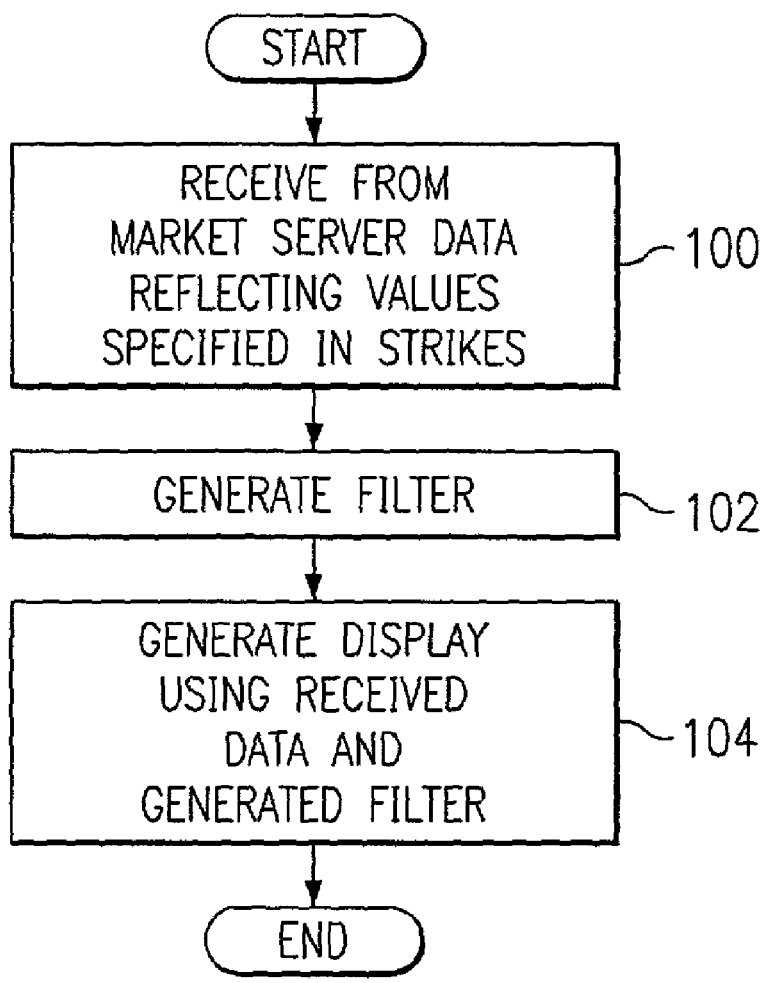

DISPLAYING STRIKES BETWEEN BIDS AND ASKS IN A MARKET OVER TIME USING POLYGONS

TECHNICAL FIELD OF THE INVENTION

This invention relates generally to electronic commerce and more particularly to displaying strikes between bids and asks in a market over time using polygons.

BACKGROUND OF THE INVENTION

Business transactions are increasingly taking place over the Internet and other electronic communication networks. Electronic markets may provide a forum for such transactions, allowing buyers to locate sellers, and vice versa. A transaction may be initiated by the matching of an appropriate offer to buy (which may be referred to as a "bid") with an appropriate offer to sell (which may be referred to as an "ask"). Such offers may include a number of offer variables, and there may be a number of possible values for each offer variable. For example, a bid may specify a bid price, a bid quantity, and possibly other values for other offer variables. Matches between bids and asks (which matches may be referred to as "strikes") may include a number of strike variables, and there may be a number of possible values for each strike variable. For example, a strike between a bid and an ask may specify a strike price, a strike quantity, and possibly other values for other strike variables. Such values may include, for example, matching values between the bid and the ask. It may be advantageous for a buyer or seller participating in a market to monitor the strikes occurring in the market. By monitoring strikes, a buyer or seller may, for example, be able to identify trends in one or more strike variables, which trends may provide bases for buy or sell decisions. However, it may be difficult for a buyer or seller to monitor strikes occurring in a market for a number of reasons. As described above, each strike may specify a number of values for a number of strike variables. Additionally, a relatively large number of strikes may occur in a relatively short period of time. As a result, there may be a relatively large amount of information to monitor and relatively little time to analyze such information.

SUMMARY OF THE INVENTION

According to the present invention, disadvantages and problems associated with previous electronic markets may be substantially reduced or eliminated.

In one embodiment of the present invention, a system for displaying strikes between bids and asks in a market over time includes a computer system. Each strike specifies values for a plurality of strike variables. The computer system receives data for a plurality of strikes. The data reflects values specified in the strikes for a plurality of strike variables. The computer system generates a display of the received data. The display includes multiple polygons. Each polygon represents a strike between a bid and an ask, and each polygon includes multiple contiguous parallelograms each associated with one or more different strike variables. One or more dimensions of each parallelogram each reflecting a value specified in the represented strike for one of the strike variables associated with the parallelogram. The display includes a strike variable axis representing a range of values for an additional strike variable for which no value is reflected in one of the dimensions of the parallelograms. Each polygon is positioned with respect to the strike variable axis according to the value specified in the represented strike for the additional strike variable represented by the strike variable axis. The display includes a time axis that is substantially perpendicular to the strike variable axis. Each polygon is positioned with respect to the time axis according to the time at which the represented strike occurred.

Particular embodiments of the present invention may provide one or more technical advantages. In particular embodiments, for example, strikes between bids and asks in a market may be displayed over time. In particular embodiments, strikes between bids and asks may be displayed using shapes, one or more aspects of which may reflect values specified in the strikes for one or more strike variables. Displaying strikes between bids and asks in this manner may allow a buyer or seller to more easily monitor strikes occurring in a market, which may in turn allow a buyer or seller to more easily identify trends in one or more strike variables that may provide a basis for a buy or sell decision. Particular embodiments may allow a user to analyze a relatively large amount of information regarding a relatively large number of strikes in a relatively short amount of time.

Systems and methods incorporating one or more of these or other technical advantages may be well suited for modern electronic markets. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 3 illustrates an example method for generating a display of strikes between bids and asks in a market over time using polygons.

DETAILED DESCRIPTION OF EXAMPLE EMBODIMENTS

Figure 1:
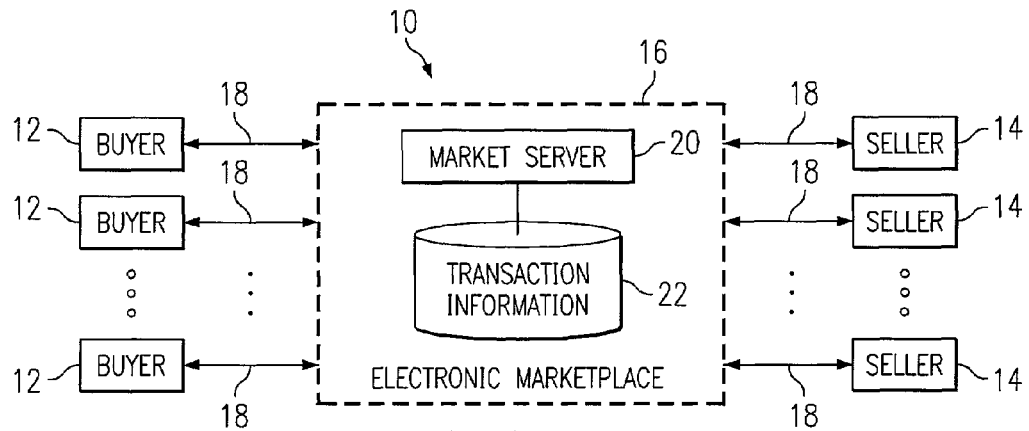
FIG. 1 illustrates an example system supporting one or more electronic markets.

FIG. 1 illustrates an example system 10 supporting one or more electronic markets. System 10 may include one or more buyers 12, one or more sellers 14, and at least one electronic marketplace 16 associated with a web site or other environment accessible to buyers 12 and sellers 14. In general, electronic marketplace 16 or an associated device may receive bids from buyers 12 and asks from sellers 14 and match appropriate bids with appropriate asks. A bid may include an offer to buy, and an ask may include an offer to sell. Such offers may include a number of offer variables, and there may be a number of possible values for each variable. For example, a bid may specify a bid price, a bid quantity, and possibly other values for other offer variables. A bid may be matched with an ask (which match may be referred to as a "strike") where one or more of the values specified in the bid substantially match one or more of the values specified in the ask. In addition or as an alternative, a bid may be matched with an ask where one or more of the values specified in the bid substantially match one or more of the values specified in the ask but one or more of the values specified in the bid do not substantially match one or more of the values specified in the ask. For example, a bid may be matched with an ask where the quantities specified in the bid and ask match each other but the bid price specified in the bid is greater than the ask price specified in the ask. In such a case, there may be an algorithm for determining a strike price for the strike between the bid and the ask. For example, the strike may be given a strike price equal to the specified ask price plus a suitable portion (such as one-half) of the price difference between the specified bid price and the specified ask price. In addition or as an alternative, a bid may be matched with an ask where there is no substantial match between any of the values specified in the bid and the values specified in the ask but a suitable relationship exists between at least some of the specified values. Strikes between bids and asks may include a number of strike variables, and there may be a number of possible values for each strike variable. For example, a strike between a bid and an ask may specify a strike price, a strike quantity, and possibly other values for other strike variables. Such values may include matching values between the bid and the ask, values determined based on a relationship between unmatched values specified in the bid and the ask, and other suitable values. The occurrence of a strike may cause a transaction to be initiated between the corresponding buyer 12 and seller 14.

Although buyers 12 and sellers 14 are described as separate entities, a buyer 12 in one transaction may be a seller 14 in another transaction, and vice versa. Moreover, reference to a "buyer" or a "seller" may include a person, a computer system, an enterprise, or any other buying or selling entity, as appropriate. For example, a buyer 12 may include a computer programmed to autonomously identify a need for an item, search for that item, and buy that item upon identifying a suitable offer to sell. Although buying and selling are primarily described herein, the present invention contemplates any appropriate market transaction. Items may include raw materials, component parts, products, or any other tangible or intangible things that may be the subject of a transaction between a buyer 12 and a seller 14, and a single item may include one or more other items. Additionally, items may include lots, blocks, bundles, bushels, or other suitable units of one or more individual items, where appropriate. For example, capacitors may be bought and sold in indivisible units of five hundred capacitors, instead of one capacitor at a time.

Buyers 12, sellers 14, and electronic marketplace 16 may be coupled to each other using links 18 that may each include one or more local area networks (LANs), metropolitan area networks (MANs), wide area networks (WANs), a portion of the Internet, or any other appropriate wireline, optical, wireless, or other links. The components of electronic marketplace 16 may operate on one or more computers at one or more locations, and electronic marketplace 16 may share one or more computers or other resources with one or more buyers 12 or one or more sellers 14, according to particular needs. Bids and asks may be received by electronic marketplace 16 or an associated device in any suitable format, such as in the form of Hypertext Markup Language (HTML), Extensible Markup Language (XML), or other suitable files within Hypertext Transport Protocol messages.

Associated with electronic marketplace 16, at one or more locations integral to or separate from electronic marketplace 16, may be one or more market servers 20 and one or more databases containing transaction information 22. In general, a market server 20 may support a particular electronic market for a particular item. For example, market server 20 may receive bids and asks for a particular item from buyers 12 and sellers 14, prioritize bids and asks, match appropriate bids with appropriate asks, determine the occurrence of a strike between a bid and an ask, determine one or more values for a strike for one or more strike variables, cancel a bid or ask automatically or at the request of the corresponding buyer 12 or seller 14 or otherwise remove a bid or ask from the market, keep a record of a particular strike by storing associated transaction information 22, initiate a transaction between buyer 12 and seller 14 in response to the occurrence of a strike, and perform other suitable tasks associated with supporting an electronic market. Transaction information 22 may include a number of records, each corresponding to a particular strike. A record of a strike may reflect a strike price, strike quantity, and possibly other values specified in the strike for other strike variables, a date and time, information identifying buyer 12 and seller 14, and other suitable information. Transaction information 22 may be used by buyer 12, seller 14, and other appropriate entities to finalize a transaction between buyer 12 and seller 14 initiated as the result of a strike and for other suitable purposes.

Figure 2:
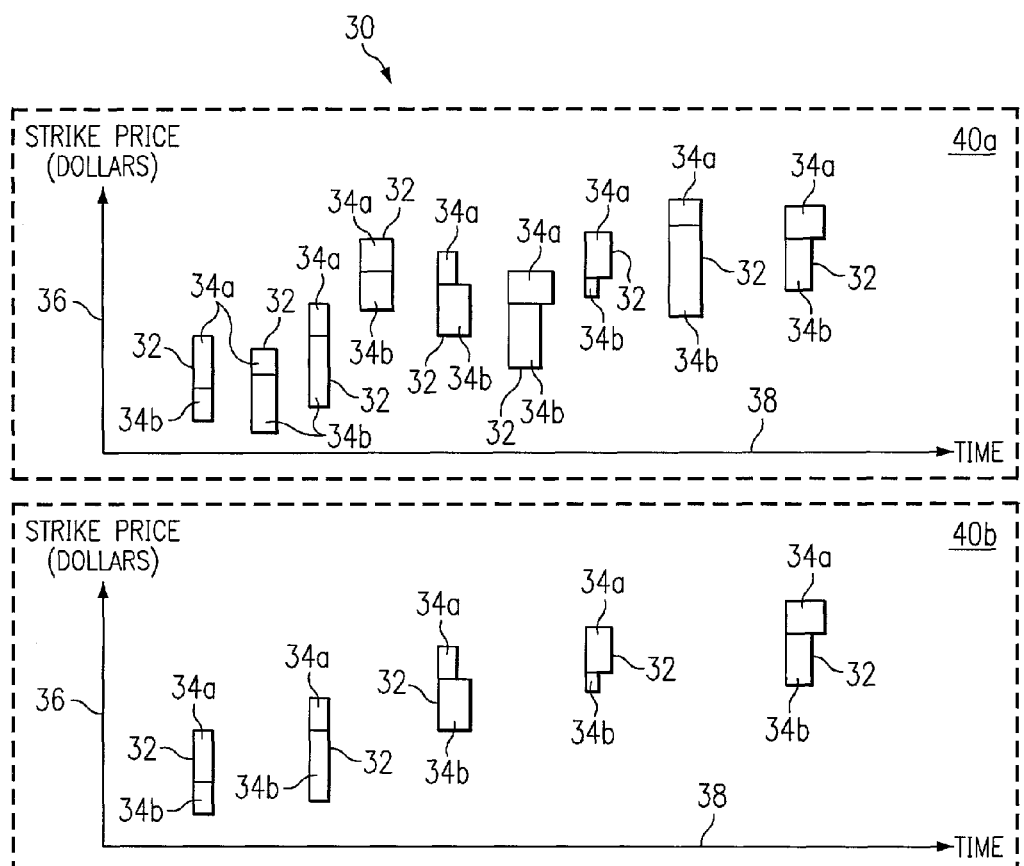
FIG. 2 illustrates an example display of strikes between bids and asks in a market over time using polygons.

FIG. 2 illustrates an example display 30 of strikes between bids and asks in a market over time using polygons. Display 30 may be generated in any suitable manner for use by any suitable entities. For example, market server 20 may communicate data reflecting strikes between bids and asks to a computer system associated with a buyer 12 or seller 14, which computer system may, using the communicated data, generate display 30 for the exclusive use of buyer 12 or seller 14. As another example, market server 20 may locally generate all or certain portions of display 30 for a buyer 12 or seller 14 and communicate corresponding display data to a computer system associated with buyer 12 or seller 14 for the exclusive use of buyer 12 or seller 14. As another example, market server 30 may locally generate certain portions of display 30 for use by a number of buyers 12 and sellers 14 and 5 communicate corresponding display data to computer systems associated with buyers 12 and sellers 14, which computer systems may modify display 30 according to particular needs. Although example markets are described herein, the present invention contemplates any suitable market in which offers to buy are matched with offers to sell. For example, the present invention may provide a display of strikes in an auction-based market, an exchange-based market, a Request for Quote (RFQ-based market, or any other suitable market. Additionally, the present invention may provide a display of strikes in a market that is part of a larger market including a number of associated markets.

Display 30 may include a number of polygons 32, each representing a strike between a bid and an ask. Each polygon 32 may include one or more contiguous parallelograms 34, and one or more aspects of a parallelogram 34 may each reflect a value for a strike variable. Such aspects may include dimensions, colors, markings, or any other suitable aspect of parallelogram 34. As an example, each polygon 32 may include two contiguous parallelograms 34, one on top of the other. The height of the upper parallelogram 34a may reflect a first value specified in the strike represented by polygon 32, the width of the upper parallelogram 34a may reflect a second value specified in the strike, the height of the lower parallelogram 34b may reflect a third value specified in the strike, and the width of the lower parallelogram 34b may reflect a fourth value specified in the strike. In particular embodiments, a user may select the strike variable for which values are reflected in each representative aspect of parallelograms 34. This may allow a user to customize display 30 according to particular needs. Although display 30 is described and illustrated as including shapes having only two dimensions representing strikes between bids and asks, the present invention contemplates any suitable shapes having any suitable number of dimensions. For example, strikes may be represented by polyhedrons that each include one or more rectangular parallelepipeds.

Display 30 may also include a strike variable axis 36 representing a strike variable. Strike variable axis 36 may include a range of values for the represented strike variable, and each polygon 32 may be placed along strike variable axis 36 according to the value specified in the strike represented by polygon 32 for the represented strike variable. Strike variable axis 36 may represent any suitable strike variable, such as strike price. In particular embodiments, a user may, in addition or as an alternative to selecting the strike variables for which values are reflected in the representative aspects of parallelograms 34, select the strike variable represented by strike variable axis 36. As an example, a user may select the strike variable represented by strike variable axis 36 and the strike variable represented by each representative aspect of parallelograms 34. As another example, a user may select the strike variable represented by strike variable axis 36, and the strike variables represented by the representative aspects of parallelograms may be automatically selected from the remaining strike variables. As described above, polygons 32 may each include two contiguous parallelograms 34, one on top of the other. In such case, strike variable axis 36 may be substantially vertical, and each polygon 32 may be placed along strike variable axis 36 such that the border between the two contiguous parallelograms 34 forming polygon 32 is aligned with a point along strike variable axis 36 corresponding to the value specified in the represented offer for the represented strike variable. Display 30 may also include a time axis 38 substantially perpendicular to strike variable axis 36. The placement of a polygon 32 along time axis 38 may indicate the time at which the represented strike occurred. Time axis 38 may include a time period that "moves" as time advances. For example, time axis 38 may include a time period of thirty minutes, and strikes that have occurred within the last thirty minutes may be represented within display 30.

As an example only and not by way of limitation, strikes between bids and asks in an exchange-based market may be represented within display 30. Represented strikes may include a strike price variable, a strike quantity variable, a delivery date variable, a packaging size variable, and a purity variable, and each strike may specify a value for each of these variables. Each strike may be represented by a polygon 32 that includes two parallelograms 34, one on top of the other. The height of the upper parallelogram 34*a* of a polygon 32 may reflect the strike quantity specified in the represented strike, the width of the upper parallelogram 34*a* of polygon 32 may reflect the packaging size specified in the represented strike, the height of the lower parallelogram 34*b* may represent the delivery date specified in the represented strike, and the width of the lower parallelogram 34*b* may represent the purity specified in the represented strike. Although the dimensions of parallelograms 34 are described and illustrated as reflecting values for strike variables, any suitable aspects of parallelograms 34 may reflect such values, as described above. Strike variable axis 36 may represent the strike price variable included within the represented strikes. Strike variable axis 36 may be substantially vertical and may include a range of strike prices. The point along strike variable axis 36 aligned with the border between the parallelograms forming a polygon 32 may indicate the strike price specified in the represented strike. Additionally, the placement of a polygon 32 along time axis 34 may indicate the time at which the represented strike occurred.

Strikes not meeting one or more criteria may be filtered from display 30 (or certain portions of display 30). Any suitable criteria may be used to filter strikes from display 30 (or certain portions of display 30). For example, strikes specifying one or more values that are (or are not) within certain ranges may be filtered from display 30 (or certain portions of display 30). In addition or as an alternative, strikes between bids and asks from unapproved market participants may be filtered from display 30. An unapproved market participant may include a seller 14 that is excluded from an applicable approved vendor list (AVL) or a buyer 12 that is excluded from an applicable approved buyer list. An approved market participant list may include an AVL for a buyer 12 or an approved buyer list for a seller 14, as appropriate. Market participants may be excluded from an approved market participant list for any suitable reason. For example, a buyer 12 may exclude from an AVL all sellers 14 not within a certain geographical area. Approved market participant lists for a particular entity may vary from item to item. For example, an AVL for item A for a buyer 12 may include a particular seller 14, while an AVL for item B for buyer 12 may exclude that seller 14. A filter may be generated in any suitable manner. As an example, criteria that may be used to filter strikes from display 30 (or certain portions of display 30) may be provided by a user. As another example, such criteria may be generated using data stored in one or more databases. Such data may one or more preferences for a user, one or more approved market participant lists for a user, or other suitable data. Any suitable combination of hardware and software supporting display 30 may filter strikes from display 30 (or certain portions of display 30).

Display 30 may include one or more windows 40 within which strikes between bids and asks may be represented. For example, display 30 may include two windows 40, window 40*a* and window 40*b*. All strikes occurring in the market may be represented within window 40*a* as described above, and strikes occurring in the market not meeting one or more criteria may be filtered from window 40*b* such that window 40*b* provides a "filtered version" of window 40*a*. Although display 30 is described and illustrated as including only two windows 40, display 30 may include any suitable number of windows 40. For example, display 30 may include a window 40 within which all occurring strikes may be represented, another window 40 within which only those strikes passing through a first filter may be represented, another window 40 within which only those strikes passing through a second filter may be represented, and so on.

FIG. 3 illustrates an example method for generating a display 30 of strikes between bids and asks in a market over time using polygons 32. The method begins at step 100, where a computer system associated with a buyer 12 receives data reflecting values specified in strikes occurring in a market. As described above, the data may be received from a market server 20 supporting the market. Although display 30 is described as being generated for a buyer 12, the present invention contemplates display 30 being generated for any suitable entities (which may include buyers 12, sellers 14, or both) for any suitable purpose, as described above. Although display 30 is described as being locally generated using data received from a market server 20, display 30 may be generated in any suitable manner, as described above. 5 At step 102, the computer system generates a filter that may be applied to the strikes. As described above, any suitable criteria may be used to filter strikes from display 30 (or certain portions of display 30). As described above, a filter may be generated in any suitable manner. As described above, any suitable combination of hardware and software supporting display 30 may filter strikes from display 30 (or certain portions of display 30). At step 104, the computer system generates display 30 using the received data the generated filter, and the method ends. As described above, display 30 may include two windows 40. One such window, window 40*a*, may be used for displaying all strikes occurring in the market, and the other, window 40b, may be used for displaying only those strikes occurring in the market that pass through the generated filter.

Although the present invention has been described with several embodiments, divers changes, substitutions, variations, alterations, and modifications may be suggested to one skilled in the art, and it is intended that the invention may encompass all such changes, substitutions, variations, alterations, and modifications fall within the spirit and scope of the appended claims.

What is claimed is:

1. A computer-implemented method, comprising:
receiving, by a computer, bids for one or more items from a plurality of buyer computer systems;
receiving, by the computer, asks for one or more items from a plurality of seller computer systems;
generating, by the computer, a plurality of strikes representing a strike between a bid and an ask for an item, wherein the plurality of strikes specify values for a plurality of strike variables;
determining, by the computer, a first value specified in one of the plurality of strikes for a first strike variable;
determining, by the computer, a second value specified in one of the plurality of strikes for a second strike variable;
determining, by the computer, a third value specified in one of the plurality of strikes for a third strike variable;
determining, by the computer, a fourth value specified in one of the plurality of strikes for a fourth strike variable; and
communicating, by the computer, the determined values for the plurality of strike variables for the item to the buyer and seller computer system.

2. The method of claim 1, further comprising:
generating a display of the received data, the display comprising:
a plurality of polygons, each polygon representing the strike between the bid and the ask, each polygon comprising first and second contiguous parallelograms each associated with one or more different strike variables, a first dimension of the first parallelogram reflecting the first value specified in the represented strike for the first strike variable, a second dimension of the first parallelogram reflecting the second value specified in the represented strike for the second strike variable, a first dimension of the second parallelogram reflecting the third value specified in the represented strike for the third strike variable, and a second dimension of the second parallelogram reflecting the fourth value specified in the represented strike for the fourth strike variable;
a strike variable axis representing a range of values for an additional strike variable for which no value is reflected in the parallelograms, wherein the strike variable axis is vertical and each polygon is positioned with respect to the strike variable axis according to the value specified in the represented strike for the additional strike variable represented by the strike variable axis; and
a time axis that is perpendicular to the strike variable axis, each polygon positioned with respect to the time axis according to a time at which the represented strike occurred.

3. The method of claim 2, wherein a user selects the strike variables for which values are reflected in the parallelograms and selects the additional strike variable represented by the strike variable axis.

4. The method of claim 2, wherein the method comprises switching the additional strike variable represented by the strike variable axis with one of the strike variables for which values are reflected in the parallelograms in response to user input.

5. The method of claim 2, wherein the strike variables for which values are specified in the strikes comprise strike price, strike quantity, and at least one additional strike variable.

6. The method of claim 2, wherein:
the strike variable axis represents a fifth strike variable and includes a range of values for the fifth strike variable;
the time axis is horizontal; and
each polygon is positioned with respect to the strike variable axis such that the border between the two contiguous parallelograms forming the polygon is aligned with a point along the strike variable axis corresponding to the value specified in the represented offer for the fifth strike variable.

7. The method of claim 6, wherein the fifth strike variable comprises strike price.

8. The method of claim 2, further comprising:
generating a filter comprising one or more strike criteria;
generating a first window within the display, the first window comprising polygons representing strikes without regard to whether the strikes meet the strike criteria within the filter; and
generating a second window within the display, the second window comprising only polygons representing strikes that meet the strike criteria within the filter.

9. The method of claim 8, wherein the strike criteria comprise at least one value specified in a strike within a range of values and at least one of the bid and the ask matched to form a strike from an approved market participant.

10. The method of claim 2, wherein the strike criteria are provided by a user.

11. The method of claim 2, wherein the market comprises an exchange-based market.

12. Software embodied in computer-readable storage media and when executed configured to:
receive bids for one or more items from a plurality of buyer computer systems;
receive asks for one or more items from a plurality of seller computer systems;
generate a plurality of strikes representing a strike between a bid and an ask for an item, wherein the plurality of strikes specify values for a plurality of strike variables;
determine a first value specified in one of the plurality of strikes for a first strike variable;
determine a second value specified in one of the plurality of strikes for a second strike variable;
determine a third value specified in one of the plurality of strikes for a third strike variable;
determine a fourth value specified in one of the plurality of strikes for a fourth strike variable; and
communicate the determined values for the plurality of strike variables for the item to the buyer and seller computer system.

13. The software of claim 12, further configured to:
generate a display of the received data, the display comprising:
a plurality of polygons, each polygon representing the strike between the bid and the ask, each polygon comprising first and second contiguous parallelograms each associated with one or more different strike variables, a first dimension of the first parallelogram reflecting the first value specified in the represented strike for the first strike variable, a second dimension of the first parallelogram reflecting the second value specified in the represented strike for the second strike variable, a first dimension of the second parallelogram reflecting the third value specified in the represented strike for the third strike variable, and a second dimension of the second parallelogram reflecting the fourth value specified in the represented strike for the fourth strike variable;

a strike variable axis representing a range of values for an additional strike variable for which no value is reflected in the parallelograms, wherein the strike variable axis is vertical and each polygon is positioned with respect to the strike variable axis according to the value specified in the represented strike for the additional strike variable represented by the strike variable axis; and a time axis that is perpendicular to the strike variable axis, each polygon positioned with respect to the time axis according to a time at which the represented strike occurred.

14. The software of claim 13, wherein a user selects the strike variables for which values are reflected in the parallelograms and selects the additional strike variable represented by the strike variable axis.

15. The software of claim 13, wherein the method comprises switching the additional strike variable represented by the strike variable axis with one of the strike variables for which values are reflected in the parallelograms in response to user input.

16. The software of claim 13, wherein the strike variables for which values are specified in the strikes comprise strike price, strike quantity, and at least one additional strike variable.

17. The software of claim 13, wherein:

the strike variable axis represents a fifth strike variable and includes a range of values for the fifth strike variable;

the time axis is horizontal; and each polygon is positioned with respect to the strike variable axis such that the border between the two contiguous parallelograms forming the polygon is aligned with a point along the strike variable axis corresponding to the value specified in the represented offer for the fifth strike variable.

18. The software of claim 17, wherein the fifth strike variable comprises strike price.

19. The software of claim 13, further configured to:

generate a filter comprising one or more strike criteria;

generate a first window within the display, the first window comprising polygons representing strikes without regard to whether the strikes meet the strike criteria within the filter; and generate a second window within the display, the second window comprising only polygons representing strikes that meet the strike criteria within the filter.

20. The software of claim 19, wherein the strike criteria comprise at least one value specified in a strike within a range of values and at least one of the bid and the ask matched to form a strike from an approved market participant.

21. The software of claim 13, wherein the strike criteria are provided by a user.

22. The software of claim 13, wherein the market comprises an exchange-based market.

* * * * *